US010030812B2

(12) United States Patent
Higgins (10) Patent No.: US 10,030,812 B2
(45) Date of Patent: Jul. 24, 2018

(54) CARGO CARRIER WALL MOUNT SYSTEM AND METHOD

(71) Applicant: John Higgins, Blythewood, SC (US)

(72) Inventor: John Higgins, Blythewood, SC (US)

(*) Notice: Subject to any disclaimer, the term of this patent is extended or adjusted under 35 U.S.C. 154(b) by 0 days.

(21) Appl. No.: 15/674,466

(22) Filed: Aug. 10, 2017

(65) Prior Publication Data

US 2018/0045365 A1 Feb. 15, 2018

Related U.S. Application Data

(60) Provisional application No. 62/373,154, filed on Aug. 10, 2016.

(51) Int. Cl.
| | |
|---|---|
| *F16M 13/02* | (2006.01) |
| *B60R 9/06* | (2006.01) |
| *B60R 9/10* | (2006.01) |
| *B60R 9/08* | (2006.01) |

(52) U.S. Cl.
CPC .............. *F16M 13/02* (2013.01); *B60R 9/06* (2013.01); *B60R 9/08* (2013.01); *B60R 9/10* (2013.01)

(58) Field of Classification Search
CPC ... F16M 13/02; A47F 5/00; A47F 7/00; B63B 17/00; B60R 9/06; B60R 9/08; B60R 9/10
USPC .... 248/447.1, 231.91, 346.5, 300, 552, 544; 211/85.7, 18, 32, 35, 75, 87.01
See application file for complete search history.

(56) References Cited

U.S. PATENT DOCUMENTS

| | | | | | |
|---|---|---|---|---|---|
| 4,061,257 | A | * | 12/1977 | St. Clair | B60R 9/06 211/70.2 |
| 4,564,167 | A | * | 1/1986 | Smith | B60R 11/06 224/404 |
| 5,456,564 | A | * | 10/1995 | Bianchini | B60P 3/07 224/508 |
| 5,586,702 | A | * | 12/1996 | Sadler | B60R 9/06 224/281 |
| 5,938,092 | A | * | 8/1999 | Johnson | B60R 9/06 224/405 |
| 7,661,543 | B1 | * | 2/2010 | Townsend | B60D 1/52 211/4 |
| 8,231,035 | B1 | * | 7/2012 | Michael | B60R 7/02 224/403 |
| 2002/0017770 | A1 | | 2/2002 | Parrish | |
| 2003/0099531 | A1 | * | 5/2003 | Williams | B60P 3/07 414/462 |
| 2006/0028036 | A1 | * | 2/2006 | Chuang | B60R 9/06 293/117 |

(Continued)

*Primary Examiner* — Muhammad Ijaz
(74) *Attorney, Agent, or Firm* — Integrity Patent Group, PLC; Edwin Wold (57) ABSTRACT

A cargo carrier wall mount system including a base-frame and a cargo-hitch-receiver assembly. The base frame includes a perimeter, center-section, and at least two lateral-braces, with the center-section and at least two lateral-braces contained within and affixed to the perimeter. Each of the center-section, the perimeter, and the two-lateral braces include a front-side, a back-side and a thickness. Also, each of the perimeter, the two-lateral braces, and the center section also include a plurality of apertures to accept and receive wall-fasteners to affix the base-frame to a vertical surface. The base-frame includes a rubber-gasket between the back-side of the base-frame and the vertical surface configured to reduce wear upon the vertical surface during use.

17 Claims, 5 Drawing Sheets

(56) References Cited

U.S. PATENT DOCUMENTS

| | | | |
|---|---|---|---|
| 2007/0034760 A1* | 2/2007 | Moore | B62H 3/12 |
| | | | 248/300 |
| 2007/0262108 A1* | 11/2007 | Columbia | B60R 9/06 |
| | | | 224/519 |
| 2008/0011698 A1 | 1/2008 | Simon | |
| 2009/0057522 A1* | 3/2009 | Bedell/Fiore | B62H 3/12 |
| | | | 248/544 |
| 2009/0180853 A1* | 7/2009 | Gang | B60R 9/06 |
| | | | 414/462 |
| 2009/0184072 A1* | 7/2009 | Fischer | H05K 7/183 |
| | | | 211/75 |
| 2010/0096347 A1 | 4/2010 | Theobald et al. | |
| 2014/0263512 A1* | 9/2014 | McCoy | B60R 9/06 |
| | | | 224/519 |
| 2015/0321716 A1* | 11/2015 | Patterson | B60D 1/58 |
| | | | 296/26.09 |

* cited by examiner

CARGO CARRIER WALL MOUNT SYSTEM AND METHOD

CROSS-REFERENCE TO RELATED APPLICATION

The present application is related to and claims priority to U.S. Provisional Patent Application No. 62/373,154 filed Aug. 10, 2016, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

1. Field of the Invention

The present invention relates generally to the field of support racks of the existing art and more specifically relates to wall mounted support racks.

2. Description of Related Art

A residential garage is generally a walled, roofed structure for storing a vehicle (or vehicles) which is part of, or attached to a home, or which is an associated outbuilding or shed. Residential garages typically have space for one or two vehicles, although three-vehicle garages may also be available. When a garage is attached to a home, there may also be an entry door into the home. Garages normally have a wide door which can be raised to permit the entry and exit of a vehicle, and then closed to secure the vehicle. The garage further protects the vehicle(s) from theft and/or vandalism.

Garages or storage facilities are also used as a place for storage of items that are not needed on a daily basis, and may contain items for homes or vehicles. Storage organizers may be used wherever there may be available room in the garage. Space is often limited in a standard garage to around the area of a vehicle, and people generally resort to installing storage units and storage shelving to house extra items.

Vehicle users may utilize the vehicle to tow various trailers or carry various cargo storage devices upon the rear of a vehicle by a vehicle hitch. One such limitation with a vehicle hitch is that when not in use, the hitch must generally be stored in a suitable location, which may take up valuable space in a garage. Therefore a suitable solution is desired.

U.S. Pat. Pub. No. 2008/0011698 to Travis Theobald and Mark Theobald relates to an apparatus, system, and method for selectively mounting a hitch mount rack on a building wall. The described apparatus, system, and method includes wall mount for supporting a hitch mount rack which comprises one or more base members comprising at least one base plate member. The wall mount further comprises a wall mount receiver projecting from the base plate member, an anchor structure on at least one of the one or more base members, and at least one fastener configured to engage the anchor structure and secure the wall mount to a building wall structure. The wall mount receiver is configured to receive a receptacle portion of a hitch mount rack.

BRIEF SUMMARY OF THE INVENTION

In view of the foregoing disadvantages inherent in the known wall mounted support racks art, the present disclosure provides a novel cargo carrier wall mount system and method. The general purpose of the present disclosure, which will be described subsequently in greater detail, is to provide an efficient and effective cargo carrier wall mount system and method.

A cargo carrier wall mount system and method is disclosed herein. The cargo carrier wall mount system includes a base-frame and a cargo-hitch-receiver assembly. The base frame includes a perimeter, a center-section, and at least two lateral-braces, with the center-section and the at least two lateral-braces contained within and preferably affixed to the perimeter. Each of the center-section, the perimeter, and the two-lateral braces include a front-side, a back-side and a thickness. Also, each of the perimeter, the two-lateral braces, and the center section also include a plurality of apertures to accept and receive wall-fasteners to affix the base-frame to a vertical surface (e.g., wall, etc.). The base-frame preferably includes a rubber-gasket between the back-side of the base-frame and the vertical surface configured to reduce wear upon the vertical surface during use and to provide adjustability/continuity in the event that the vertical surface is not truly flat or includes a textured surface.

The cargo-hitch-receiver assembly includes a top-receiver, and a bottom-support, with the cargo-hitch-receiver configured to accept a vehicle-hitch-device (e.g., trailer hitch, trailer-mounted cargo carrier, bike rack, etc.), with the cargo-hitch-receiver assembly affixed to the front-side of the base-frame. Preferably, the cargo-hitch-receiver assembly includes at least two pin-holes configured to each receive a pin to secure the vehicle-hitch-device.

The bottom-support of the cargo-hitch-receiver assembly preferably includes a lip configured to prevent the vehicle-hitch-device from sliding outwardly from the bottom-support. Further, bottom-support of the cargo-hitch-receiver assembly includes a rubberized-pad to increase friction between the vehicle-hitch-device to additionally prevent the vehicle-hitch-device from sliding from outwardly from the bottom-support.

The top-receiver also includes a sleeve constructed from a plastic material configured to provide a stable interface (i.e., tight fit) between the top-receiver and the vehicle-hitch-device during use.

The interface between the base-frame and the cargo-hitch-receiver preferably includes a plurality of gussets configured to provide lateral support to the cargo-hitch receiver in relation to the base-frame during use. Also, the cargo-hitch-receiver is permanently affixed to base-frame, in the preferred embodiment. Further, the system is configured to be affixable to a vertical surface being a wall which includes stud-frame construction, and the plurality of apertures of the base-frame are configured such that the wall-fasteners are affixable to at least two wall studs contained within the vertical surface.

According to another embodiment, a method of using a cargo carrier wall mount system is also disclosed herein. The method of use includes a first step, providing a cargo carrier wall mount system including a base-frame and a cargo-hitch-receiver assembly; a second step, affixing the cargo carrier wall mount system to a vertical surface via a plurality of fasteners; a third step, inserting a vehicle-hitch-device into the cargo-hitch-receiver assembly; a fourth step, removing the vehicle-hitch-device from the cargo-hitch-receiver assembly; and a fifth step, removing the cargo carrier wall mount system from the vertical surface.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a cargo carrier wall mount system and method, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to wall mounted support racks and more particularly to a cargo carrier wall mount system and method as used to improve the storage of a vehicle hitch device while minimizing the space required to store such a device.

Generally, the cargo carrier wall mount system is a simple wall mount system which takes advantage of cargo carrier systems currently out on the market that attach to the hitch receiver of vehicles. This system may be mounted in a garage or other suitable location and allows storage of a cargo carrier system.

The cargo carrier wall mount system utilizes a wide base-frame allowing for increased hanging strength when attaching a heavy cargo carrier. The base-frame incorporates a plurality of mounting holes to permit installation on virtually any flat surface in a garage or other location(s). The system is easily modified to allow for a variety of cargo hitch configurations. The system's design distributes weight to key areas of the frame while lowering the overall weight using triangular cut outs; however, the triangular cut outs do not weaken the overall structural integrity of the system.

Figure 1:
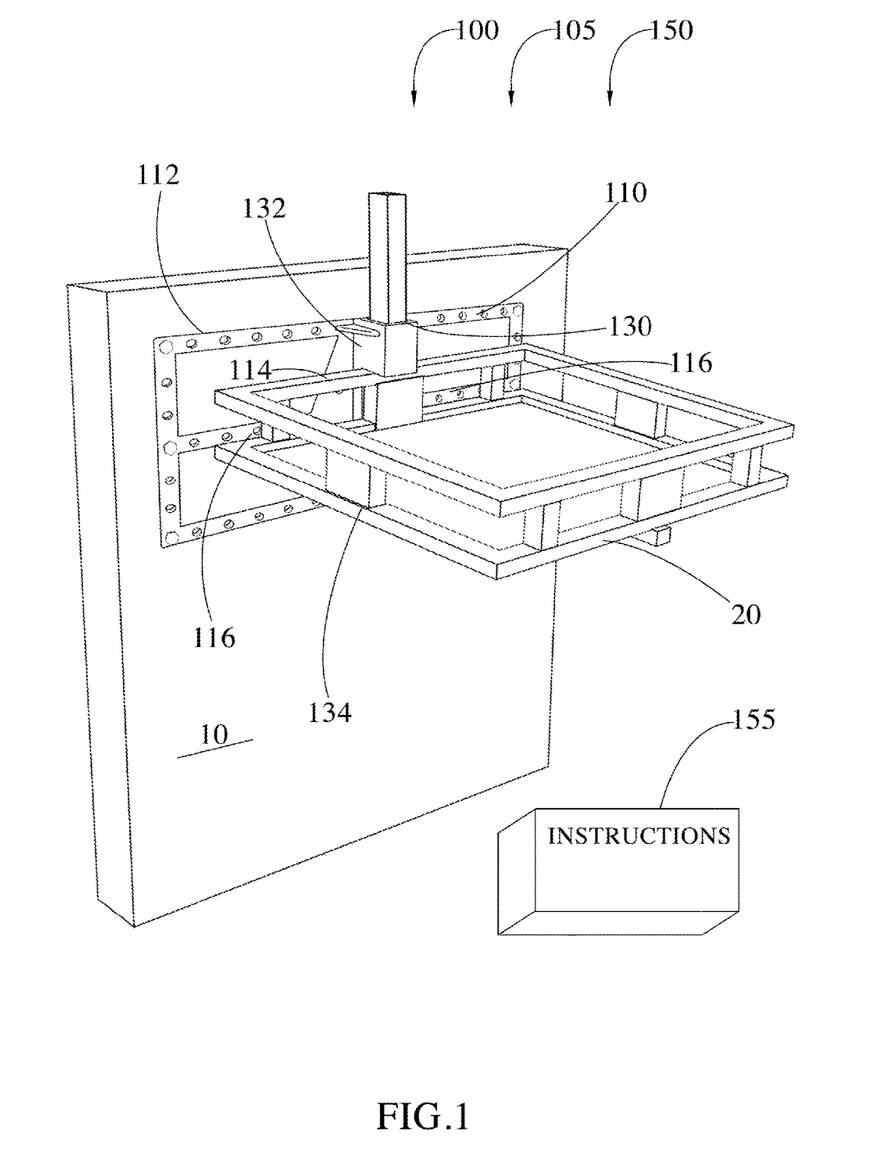
FIG. 1 is a perspective view of the cargo carrier wall mount system during an 'in-use' condition, according to an embodiment of the disclosure.
Figure 2:
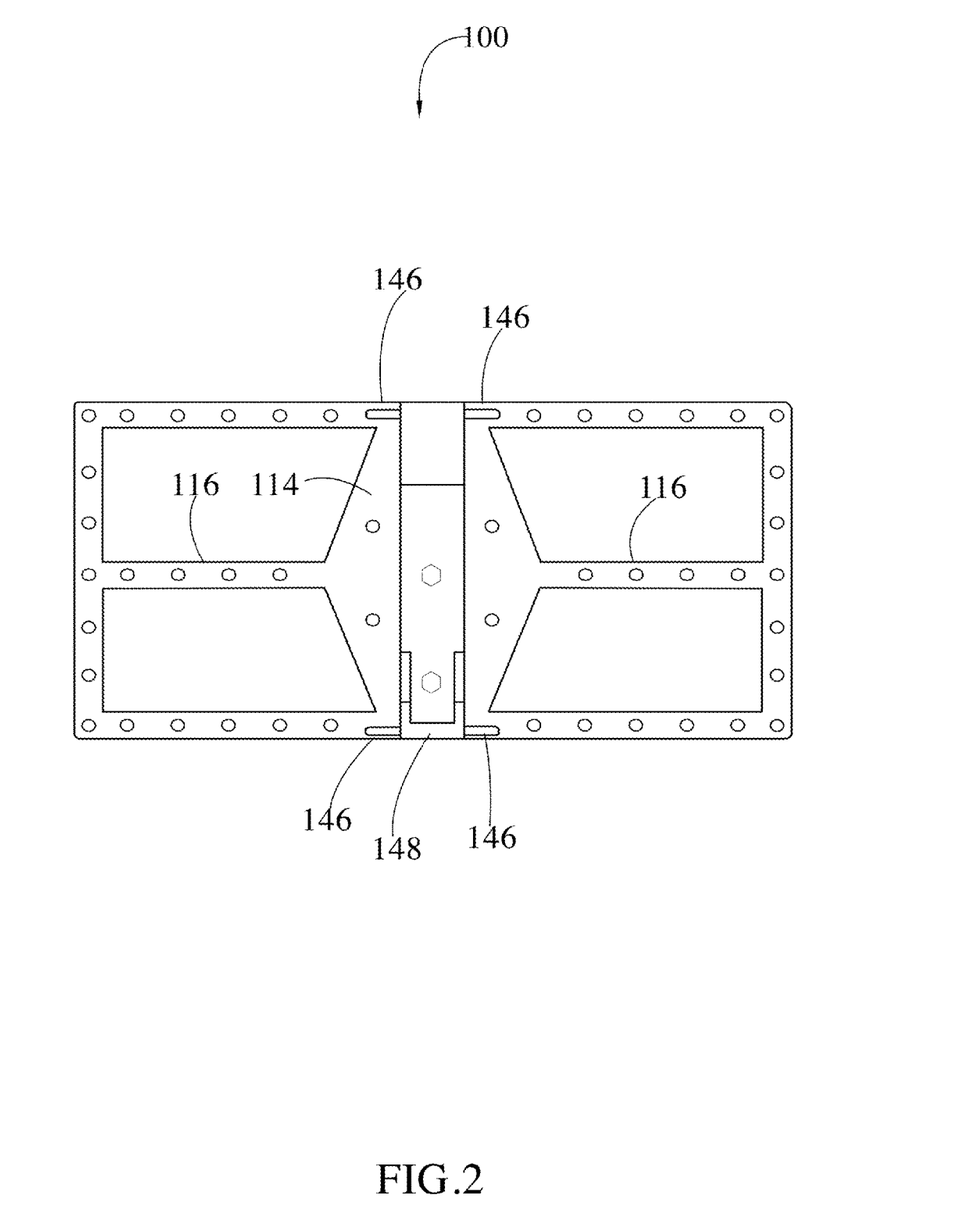
FIG. 2 is a front view of the cargo carrier wall mount system of FIG. 1, according to an embodiment of the present disclosure.
Figure 3:
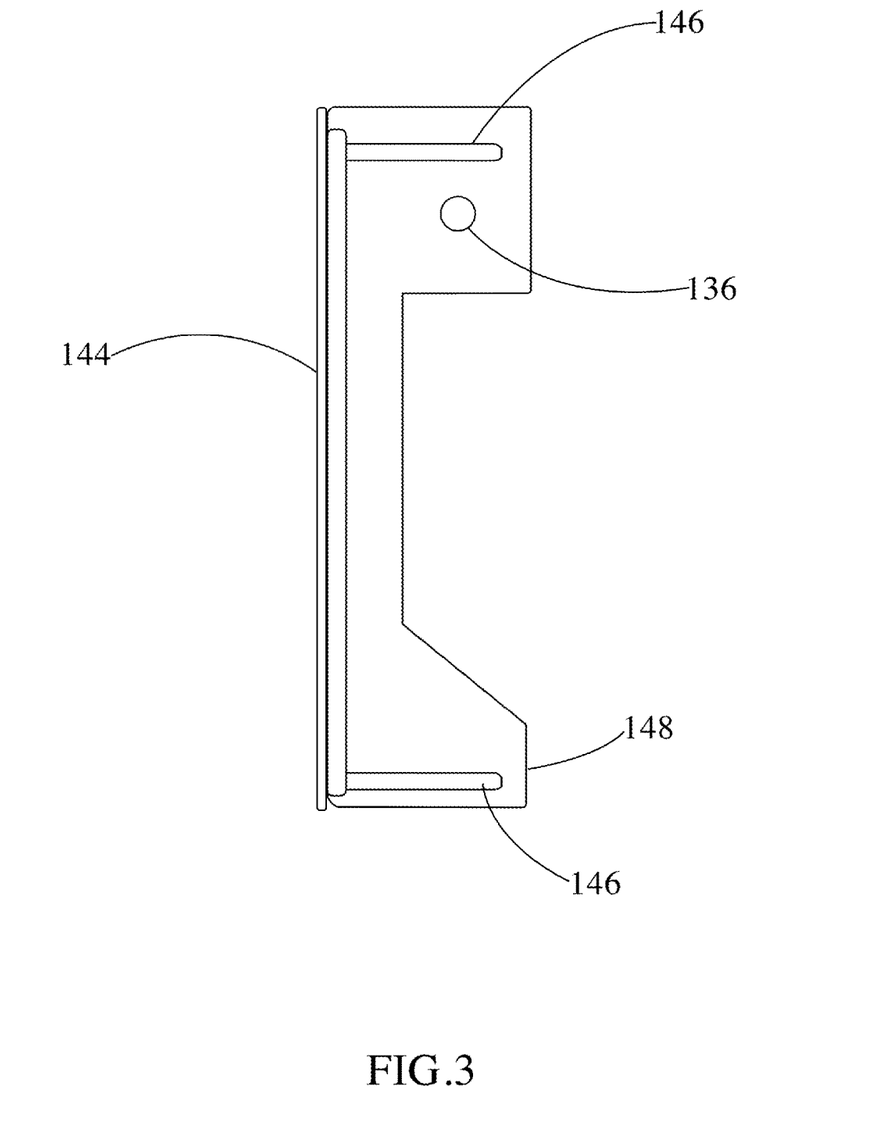
FIG. 3 is a left-side view of the cargo carrier wall mount system of FIG. 1, according to an embodiment of the present disclosure.
Figure 4:
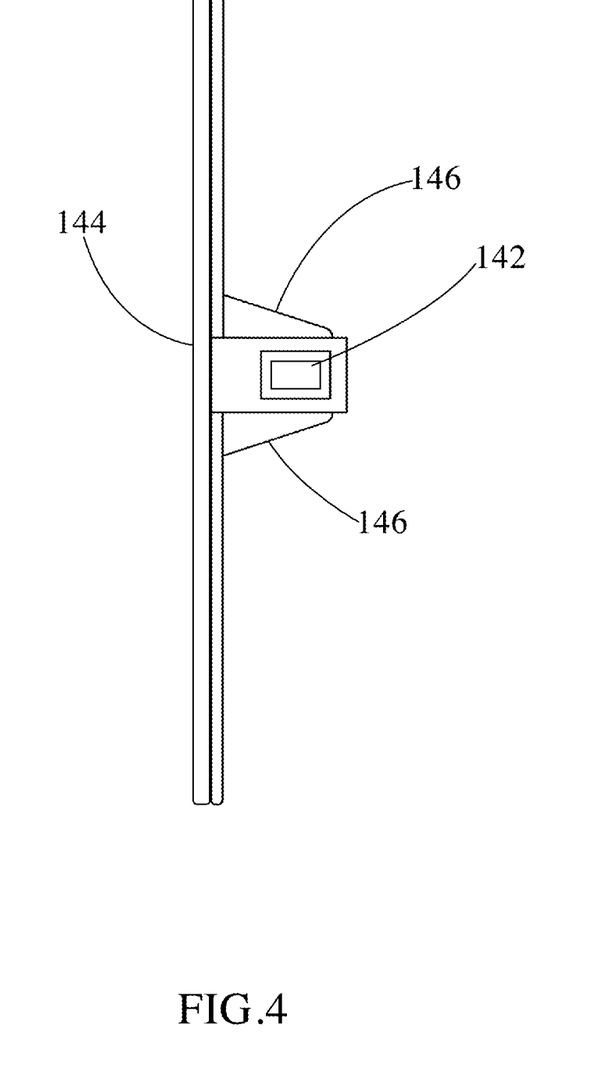
FIG. 4 is a top view of the cargo carrier wall mount system of FIG. 1, according to an embodiment of the present disclosure.

Referring now more specifically to the drawings by numerals of reference, there is shown in FIGS. 1-4, various views of cargo carrier wall mount system 100. FIG. 1 shows cargo carrier wall mount system 100 during 'in-use' condition 150, according to an embodiment of the present disclosure. Here, cargo carrier wall mount system 100 may be beneficial for use by a user to provide a space-saving apparatus to store devices that can be mounted to a trailer-hitch receiver of a vehicle while the device is not in use. As illustrated, cargo carrier wall mount system 100 may include base-frame 110 and cargo-hitch-receiver assembly 130.

According to one embodiment, cargo carrier wall mount system 100 may be arranged as a kit 105. In particular, cargo carrier wall mount system 100 may further include set of instructions 155. Instructions 155 may detail functional relationships in relation to the structure of cargo carrier wall mount system 100 (such that cargo carrier wall mount system 100 can be used, maintained, or the like, in a preferred manner).

FIGS. 1-4 show cargo carrier wall mount system 100 of FIG. 1, according to an embodiment of the present disclosure. As above, cargo carrier wall mount system 100 may include base-frame 110 and cargo-hitch-receiver assembly 130. Base frame 110 may include perimeter 112, center-section 114, and at least two lateral-braces 116, with of the center-section 114 and the at least two lateral-braces 116 contained within, and affixed to perimeter 112. Each of center-section 114, perimeter 112, and lateral-braces 116 including front-side 120, back-side 122 and thickness 124. Also, each of perimeter 112, two (or more) lateral-braces 116, and center-section 114 may include plurality of apertures 126 to accept and receive wall-fasteners to affix base-frame 110 to vertical surface 10.

Cargo-hitch-receiver assembly 130 may include top-receiver 132, and bottom-support 134, with cargo-hitch-receiver assembly 130 configured to accept vehicle-hitch-device 20, with cargo-hitch-receiver assembly 130 affixed to front-side 120 of base-frame 110.

Cargo-hitch-receiver assembly 130 may further include at least two pin-holes 136 configured to each receive pin (not shown) to secure vehicle-hitch-device 20. Also, bottom-support 134 of cargo-hitch-receiver assembly 130 may further include lip 148 configured to prevent vehicle-hitch-device 20 from sliding from bottom-support 134.

Additionally, bottom-support 134 of cargo-hitch-receiver assembly 130 may further include rubberized-pad 140 to increase friction between vehicle-hitch-device 20 configured to prevent vehicle-hitch-device 20 from sliding from bottom-support 134.

Top-receiver 132 may include sleeve 142 constructed from a plastic (or other suitable materials) material configured to provide a stable interface between top-receiver 132 and vehicle-hitch-device 20 during use. Back-side 122 of base-frame 110 may also include rubber-gasket 144 between back-side 122 of base-frame 110 and vertical surface 10 configured to reduce wear upon vertical surface 10 during use. The interface between base-frame 110 and cargo-hitch-receiver assembly 130 may further include a plurality of gussets 146 configured to provide lateral support to cargo-hitch receiver assembly 130 in relation to base-frame 110 during use.

Cargo-hitch-receiver assembly 130 may be permanently affixed to base-frame 110, in embodiments. Other embodiments may include cargo-hitch-receiver assembly 130 removably affixable to base-frame 110 via a plurality of fasteners. Also, cargo carrier wall mount system 100 may be configured to be affixable to vertical surface 10, with vertical surface 10 including a concrete wall for example.

Cargo carrier wall mount system 100 may be configured to be affixable to the vertical surface 10 which includes concrete-block construction, and/or may be configured to be affixable to the vertical surface 10 being a wall which includes stud-frame construction.

Plurality of apertures of base-frame 110 may be configured such that the wall-fasteners are affixable to two standard spaced wall studs (through apertures 126). Similarly, plurality of apertures 126 of base-frame 110 may be configured such that the wall-fasteners are affixable to at least three standard spaced wall studs. Plurality of apertures 126 of the base-frame 110 may also be configured to be affixable to at least two wall studs which are not of standard spacing. Cargo carrier wall mount system 100 may be powder-coated for durability and longevity during use.

Figure 5:
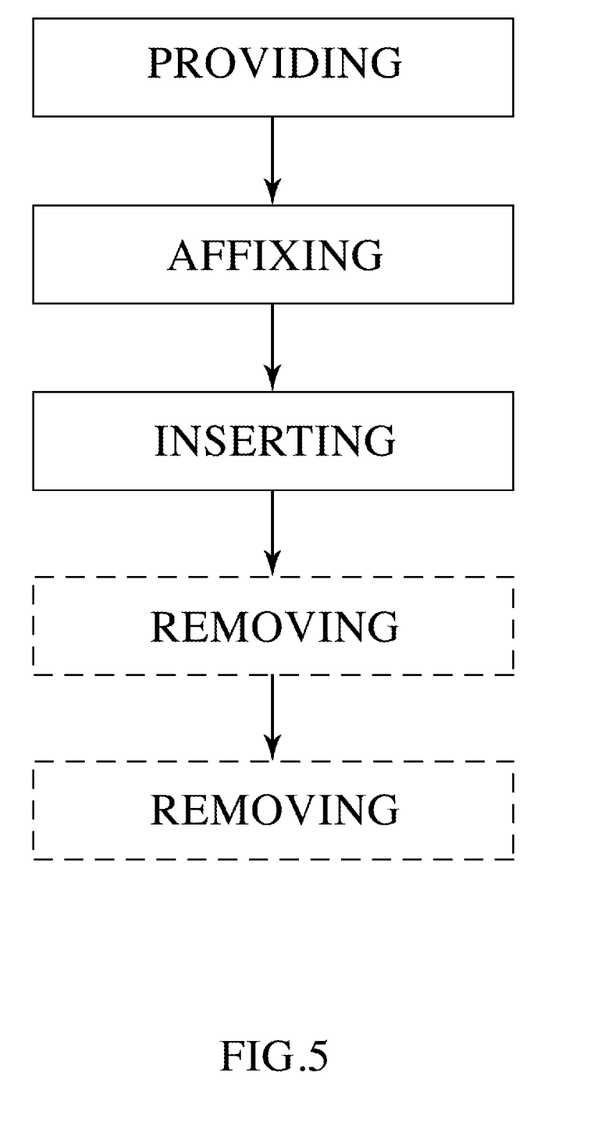
FIG. 5 is a flow diagram illustrating a method of using a cargo carrier wall mount system, according to an embodiment of the present disclosure.

FIG. 5 is a flow diagram illustrating a method of using 500 a cargo carrier wall mount system 100, according to an embodiment of the present disclosure. In particular, the method for method of use 500 may include one or more components or features of the cargo carrier wall mount system 100 as described above. As illustrated, the method for using 500 a cargo carrier wall mount system 100 may include the steps of: step one 501, providing cargo carrier wall mount system 100 including base-frame 110 and cargo-hitch-receiver assembly 130; step two 502, affixing cargo carrier wall mount system 100 to vertical surface 10 via a plurality of fasteners; step three 503, inserting vehicle-hitch-device 20 into cargo-hitch-receiver assembly 130; step four 504, removing vehicle-hitch-device 20 from cargo-hitch-receiver assembly 130; and step five 505, removing cargo carrier wall mount system 100 from vertical surface 10.

It should be noted that step four 504 and step five 505 are optional steps and may not be implemented in all cases. Optional steps of method of use 500 are illustrated using dotted lines in FIG. 5 so as to distinguish them from the other steps of method of use 500. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods of using a cargo carrier wall mount system (e.g., different step orders within above-mentioned list, elimination or addition of certain steps, including or excluding certain maintenance steps, etc.), are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A cargo carrier wall mount system, the system comprising:
    a base-frame, the base frame including a perimeter, a center-section, and at least two lateral-braces, with of the center-section and the at least two lateral-braces contained within and affixed to the perimeter; each of the center-section, the perimeter, and the two-lateral braces including a front-side, a back-side and a thickness; and each of the perimeter, the two-lateral braces, and the center section including a plurality of apertures to accept and receive wall-fasteners to affix the base-frame to a vertical surface; and
    a cargo-hitch-receiver assembly, the cargo-hitch-receiver including a top-receiver, and a bottom-support, with the cargo-hitch-receiver configured to accept a vehicle-hitch-device, with the cargo-hitch-receiver assembly affixed to the front-side of the base-frame;
    wherein the bottom-support of the cargo-hitch-receiver assembly further includes a rubberized-pad to increase friction between the vehicle-hitch-device so configured to prevent the vehicle-hitch-device from sliding from the bottom-support.

2. A cargo carrier wall mount system, the system comprising:
    a base-frame, the base frame including a perimeter, a center-section, and at least two lateral-braces, with of the center-section and the at least two lateral-braces contained within and affixed to the perimeter; each of the center-section, the perimeter, and the two-lateral braces including a front-side, a back-side and a thickness; and each of the perimeter, the two-lateral braces, and the center section including a plurality of apertures to accept and receive wall-fasteners to affix the base-frame to a vertical surface; and
    a cargo-hitch-receiver assembly, the cargo-hitch-receiver including a top-receiver, and a bottom-support, with the cargo-hitch-receiver configured to accept a vehicle-hitch-device, with the cargo-hitch-receiver assembly affixed to the front-side of the base-frame;
    wherein the top-receiver further includes a sleeve constructed from a plastic material configured to provide a stable interface between the top-receiver and the vehicle-hitch-device during use.

3. The system of claim 2, wherein the cargo-hitch-receiver assembly further includes at least two pin-holes configured to each receive a pin to secure the vehicle-hitch-device.

4. The system of claim 2, wherein the bottom-support of the cargo-hitch-receiver assembly further includes a lip configured to prevent the vehicle-hitch-device from sliding from the bottom-support.

5. The system of claim 2, wherein the interface between the base-frame and the cargo-hitch-receiver further includes a plurality of gussets configured to provide lateral support to the cargo-hitch receiver in relation to the base-frame during use.

6. The system of claim 2, wherein the cargo-hitch-receiver is permanently affixed to the base-frame.

7. The system of claim 2, wherein the cargo-hitch-receiver is removably affixable to the base-frame via a plurality of fasteners.

8. The system of claim 2, wherein the system is configured to be affixable to the vertical surface, the vertical surface including a concrete wall.

9. The system of claim 8, wherein the system is configured to be affixable to the vertical surface being the wall which includes stud-frame construction.

10. The system of claim 9, wherein the plurality of apertures of the base-frame are configured such that the wall-fasteners are affixable to two standard spaced wall studs.

11. The system of claim 9, wherein the plurality of apertures of the base-frame are configured such that the wall-fasteners are affixable to at least three standard spaced wall studs.

12. The system of claim 9, wherein the plurality of apertures of the base-frame are configured to be affixable to at least two wall studs which are not of standard spacing.

13. The system of claim 2, wherein the system is configured to be affixable to the vertical surface which includes concrete-block construction.

14. The system of claim 2, wherein the system is powder-coated for durability and longevity during use.

15. A cargo carrier wall mount system kit comprising:
  a base-frame, the base frame including a perimeter, a center-section, and at least two lateral-braces, with of the center-section and the at least two lateral-braces contained within and affixed to the perimeter; each of the center-section, the perimeter, and the two-lateral braces including a front-side, a back-side and a thickness; and each of the perimeter, the two-lateral braces, and the center section including a plurality of apertures to accept and receive wall-fasteners to affix the base-frame to a vertical surface; and
  a cargo-hitch-receiver assembly, the cargo-hitch-receiver including a top-receiver, and a bottom-support, with the cargo-hitch-receiver configured to accept a vehicle-hitch-device, with the cargo-hitch-receiver assembly affixed to the front-side of the base-frame; and
  a set of instructions;
  wherein the bottom-support of the cargo-hitch-receiver assembly further includes a rubberized-pad to increase friction between the vehicle-hitch-device so configured to prevent the vehicle-hitch-device from sliding from the bottom-support.

16. A method of using the cargo carrier wall mount system of claim 2, the method comprising the steps of:
  providing a cargo carrier wall mount system including a base-frame and a cargo-hitch-receiver assembly,
  affixing the cargo carrier wall mount system to a vertical surface via a plurality of fasteners, and
  inserting a vehicle-hitch-device into the cargo-hitch-receiver assembly.

17. The method of claim 16, further comprising the steps of:
  removing the vehicle-hitch-device from the cargo-hitch-receiver assembly, and
  removing the cargo carrier wall mount system from the vertical surface.

* * * * *